United States Patent [19]
Anderson

[11] Patent Number: 5,148,496
[45] Date of Patent: Sep. 15, 1992

[54] OPTICAL CORRELATOR WITH SYMMETRIC REFLECTIVE OPTICS

[75] Inventor: Robert H. Anderson, Long Beach, Calif.

[73] Assignee: Litton Systems, Inc., Beverly Hills, Calif.

[21] Appl. No.: 632,934

[22] Filed: Dec. 24, 1990

[51] Int. Cl.⁵ .............................. G06K 9/64
[52] U.S. Cl. .................... 382/42; 364/822; 382/31; 359/561; 359/29
[58] Field of Search .......... 382/42, 31; 350/162.12, 350/162.13, 3.68, 3.7, 3.6, 106, 104, 107, 109, 619; 364/728.03, 819, 822; 365/125

[56] References Cited
U.S. PATENT DOCUMENTS

| | | |
|---|---|---|
| 4,838,644 | 6/1989 | Ochoa et al. ............ 382/42 |
| 4,903,314 | 2/1990 | Fine ......................... 382/42 |
| 4,980,922 | 12/1990 | Leib ......................... 382/42 |

OTHER PUBLICATIONS

Duthie et al., "Compact real-time coherent optical correlators", *Optical Engineering*, Jan.-Feb. 1984, vol. 23, No. 1, pp. 7-11.

*Primary Examiner*—David K. Moore
*Assistant Examiner*—Joseph Mancuso
*Attorney, Agent, or Firm*—Donald J. Ellingsberg

[57] ABSTRACT

A discoid optical correlator system having a plurality of reflective optical components, a source of electromagnetic radiation, such as visible light, and an output detector which are positioned around the rim region of a solid disk body to develop a symmetrically folded optical axis traversed by a beam of electromagnetic radiation so that an unknown object is optically detected and identified.

24 Claims, 4 Drawing Sheets

OPTICAL CORRELATOR WITH SYMMETRIC REFLECTIVE OPTICS

COPYRIGHT MATERIAL

The description of the invention contains material which may be the subject of copyright protection. Reproduction of the patent document as it appears in the United States Patent and Trademark Office is permitted in furtherance of the United States Patent Laws (Title 35 United States Code). The copyright owner of this material reserves all other rights under the United States Copyright Laws (Title 17 United States Code).

BACKGROUND OF THE INVENTION

1. Field of the Invention

The invention is a discoid optical correlator system having reflective optical components positioned along a symmetrically folded optical axis between a light beam generator and an output detector.

2. Description of the Related Art

Optical correlators can perform complex pattern recognition more rapidly than known digital techniques. Optical correlators are capable of processing large amounts of data that can be useful in the detection, extraction and classification of desired information included in the data. Although known optical systems can perform extremely high speed, two-dimensional pattern recognition, their development has been hindered by the lack of suitable optical components; particularly at the input plane and at the spatial filter plane. However, the recent development of magneto-optic display assemblies (for example, see Robert H. Anderson's U.S. Pat. No. 4,573,198 which is assigned to the same assignee) provides a two-dimensional array of electronically programmable light shutters or valves that can be used to enter information into optical correlators at very high rates, e.g., about 2000 frames per second. Such optical correlators can operate in or nearly at real-time. [See Mills and Ross, "Dynamic Magneto-optic Correlator: Real-time Operation", Society of Photo-Optical Instrumentation Engineers (SPIE) Acoustic-Optic, Electro-Optic and Magneto-Optic Devices and Applications (1987) vol. 753, pp 54-63.]

SUMMARY OF THE INVENTION

Briefly, in accordance with the preferred embodiment of the invention, a discoid optical correlator system is disclosed having a plurality of reflective optical components, a source of electromagnetic radiation, such as visible light, and an output detector are positioned around the rim region of a solid disk body to develop a symmetrically folded optical axis traversed by the beam of electromagnetic radiation so that an unknown object is optically detected and identified.

Accordingly, one object of the invention is to provide a discoid optical correlator system.

Another object is to provide a discoid optical correlator system that is extremely compact.

Another object is to provide a discoid optical correlator system that is able to withstand extreme acceleration and shock forces.

Another object is to provide a discoid optical correlator system having reflective optical components.

Another object is to provide a discoid optical correlator system have a symmetrical and folded optical path between a source and a detector electromagnetic radiation.

Another object is to provide a discoid optical correlator system have plural symmetrical and folded paths that can be selectively linked.

Another object is to provide an optical correlator system resistant to centrifugal forces.

Another object is to provide a plural discoid optical correlator system having an extended optical path.

Another object is to provide a plural discoid optical correlator system having reduced system dimensions.

Further objects, features and the attending advantages of the invention will be apparent when the following description is read in view of the accompanying drawings.

BRIEF DESCRIPTION OF THE DRAWING(S)

DESCRIPTION OF THE PREFERRED EMBODIMENT

Figure 1:
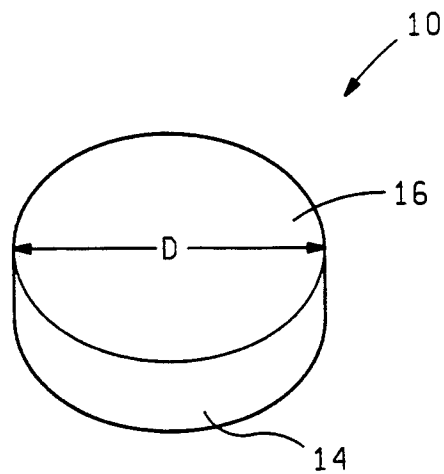
FIG. 1 is a perspective view of the discoid optical correlator system of the invention as the preferred embodiment.
Figure 2:
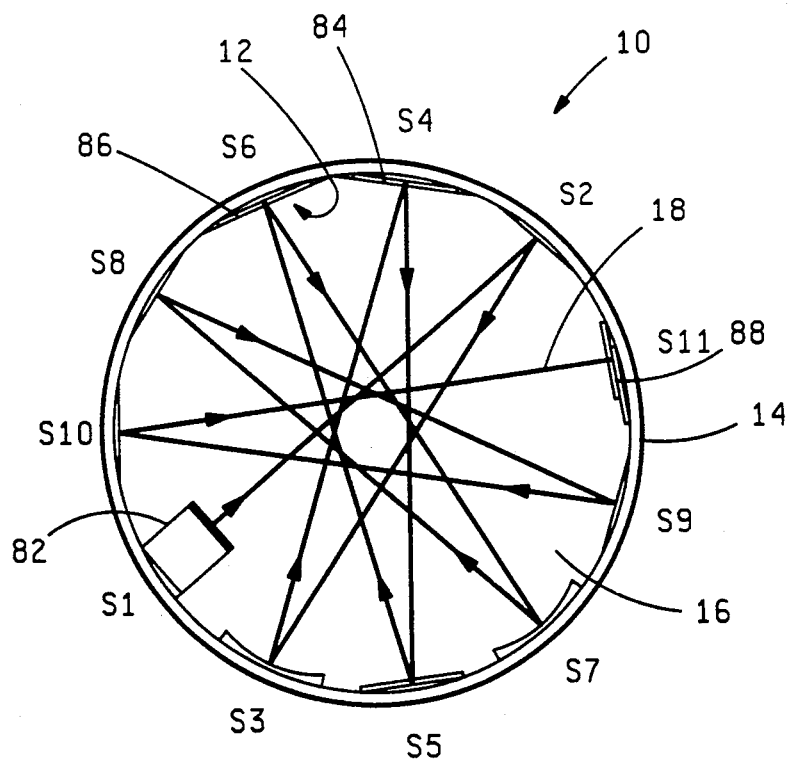
FIG. 2 is an enlarged plan view, in cross section, of the discoid optical correlator system of FIG. 1.

The extremely compact discoid optical correlator system 10 of the invention is shown by FIGS. 1 and 2. Reflective optical components 12, as will be described, are placed in or around the outer edge or rim 14 of a disk body 16. This "hockey puck" correlator body in the embodiment as shown approximates in size and shape that of a known hard rubber disk or puck used in the sport of ice hockey. For example, the correlator body 16 can be a transparent, fused quartz (SiO$_2$) disk about 2 inches (5.08 centimeters) in diameter and about ¾ inch (1.90 centimeters) thick. Because natural quartz which is birefringent can cause problems when used with a coherent or polarized light beam, fused quartz is a preferred material. It is contemplated that other materials such as glass, acrylic or similar clear plastic compositions could also be considered for use.

A symmetrical star-shaped optical path 18, which is folded as shown through use of these reflective optical components, is maintained entirely within the disk body 16.

In the discoid optical correlator system 10 of FIGS. 1 and 2, three principal factors are considered:

1. A conventional PRIOR ART linear correlator is redesigned so that every optical component is positioned at a periodic location along an unfolded or linear optical path.
2. Each transmissive optical component in the linear correlator is replaced by an equivalent reflective optical component or assembly of such components.
3. The reflective optical components are positioned in an equally-spaced apart and diametrically opposed relationship to develop a symmetrically folded optical path.

The description of the discoid optical correlator system 10 of the invention with its symmetrical and folded optical path can be more clearly understood when it is considered in view of a PRIOR ART VanderLugt linear optical correlator.

Figure 3:
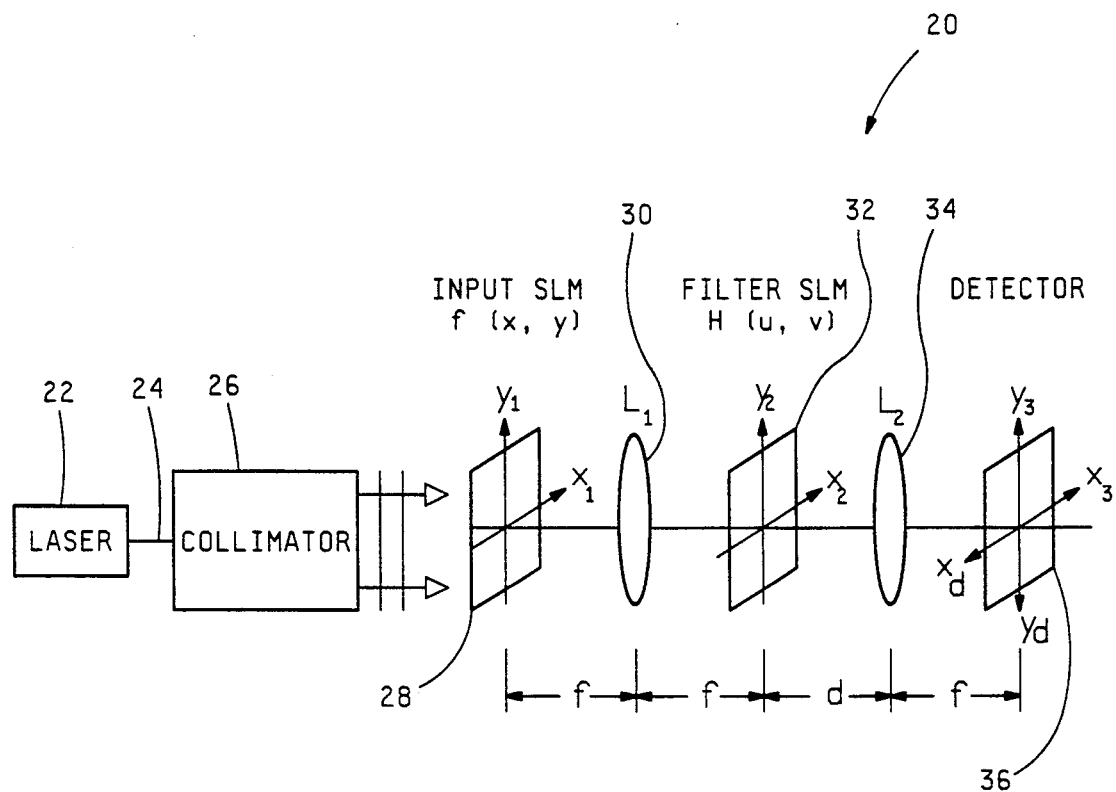
FIG. 3 is a schematic elevation view of a PRIOR ART VanderLugt linear optical correlator system.

In the PRIOR ART optical correlator system 20 as shown by FIG. 3, a laser 22 develops a high intensity output beam 24 that is collimated through a collimator 26, and then expanded and focused by a suitable lens system onto an input spatial light modulator (SLM) 28. This SLM 28 has a transmission function f(x,y) which represents an object to be identified. Lens 30 images the Fourier transform of f(x,y), F(u,v) onto a filter SLM 32 in the Fourier plane. The filter SLM 32 has a transmission function H(u,v), where H(u,v) is the Fourier transform of some function h(x,y). The optical field immediately downstream after the filter SLM 32 then is the product of F(u,v)H(u,v). A second lens 34 images the Fourier transform of this product onto a detector 36. The intensity at the detector 36 is determined by the following:

$$I(x_3,y_3) = \left| \int_{-\infty}^{\infty} f(p,q)h(-x_3 - p, -y_3 - q)dpdq \right|^2.$$

It is conventional to use an inverted coordinate system at the plane of detector 36; thus, $(x_d, y_d) = (-x_3, -y_3)$, which can be expressed as follows:

$$I(x_d,y_d) = \left| \int_{-\infty}^{\infty} f(p,q)h(-x_d - p, -y_d - q)dpdq \right|^2.$$

For $h(x,y) = g^*(-x,-y)$, i.e. $H(u,v) = G^*(u,v)$, this intensity is the square of the cross-correlation of f(x,y) with g(x,y). For $h(x,y) = f^*(-x,-y)$, i.e. $H(u,v) = F^*(u,v)$, this intensity is the square of the auto-correlation of f(x,y) with itself. Such an auto-correlation produces a bright spot in the detector plane.

(It should be noted that the distance d from the filter SLM chip 32 to lens 34 is not critical since it affects neither the correlation intensity pattern nor the imaging condition from the input plane at SLM chip 2 to the detector plane at detector 36.)

Figure 4:
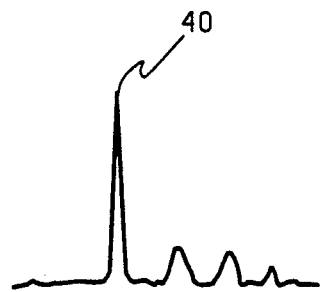
FIG. 4 is a graphical representation of an output waveform of an optical correlator system.

Therefore, to identify an object, its transmission function f(x,y) is correlated against a set of filters $H_1(u,v) .. . H_n(u,v)$. Each of these filters is written onto the filter plane SLM 32 sequentially, and the correlation for each is obtained. The filter which produces an autocorrelation peak, such as peak 40 of FIG. 4, in the detector plane 36 indicates the identity of the object. The location of the object is indicated by the location of the autocorrelation peak in the detector plane.

Figure 5:
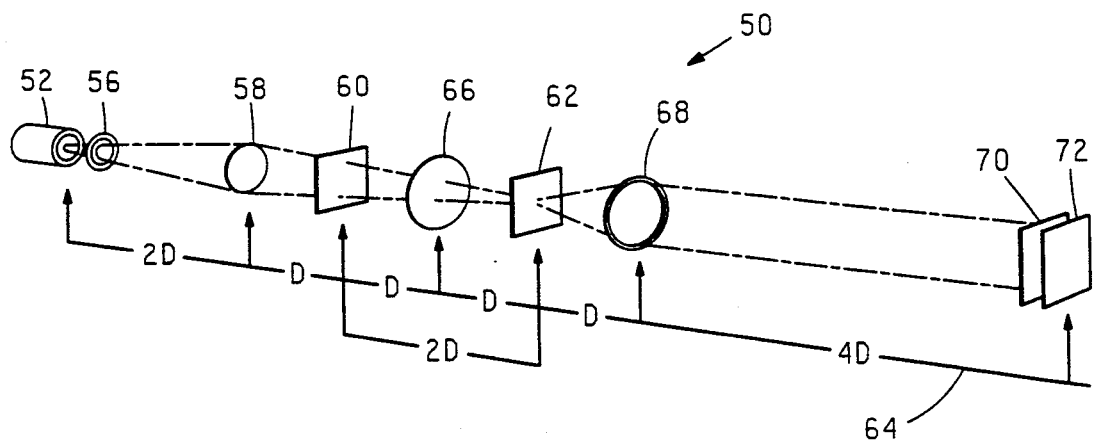
FIG. 5 is a schematic perspective view of a redesigned linear optical correlator system in accordance with the invention.

With this understanding of the principle of operation of a VanderLugt correlator, it will further assist in understanding the discoid optical correlator system 10 of the invention by next considering a linear optical correlator system 50 as shown by FIG. 5 that is based upon this principle.

In FIG. 5, linear optical correlator system 50 has a source of radiant energy, for example, laser diode 52 with a constant of 780 mu, develops a coherent light beam that is directed along the optical axis of the system. The coherent light beam passes through a polarizer element 56 and an expansion lens 58 that has a focal length, for example, of 2.4 inches or 6.10 centimeters. The expanded light beam passes through an electrically addressable magneto-optic spatial light modulator (SLM) chip 60, which functions as an input SLM, to focus on a similar downstream SLM chip 62 which functions as a filter SLM. Such an SLM chip can be a LIGHT-MOD ™ chip that is available from the Data Systems Division of Litton Systems, Inc., Van Nuys, Calif. One such SLM chip now available has a chip width of 0.128 inch (0.325 centimeter) formed with individual mesas arranged in a 128×128 array where each individual mesa with complementary address lines functions as a magneto-optic light valve.

The input SLM chip 60 as an array gives rise to a replicated Fourier transform by the array theorem of Fourier optics as discussed above. Accordingly, the design starting point for such a linear optical correlator system 50 is to provide that the order spacing of the replicated Fourier transform should equal the width of a SLM filter chip 62; here the LIGHT MOD chip with a 128×128 array has a width of 0.128 inch with a 0.001 inch mesa pitch. Thus the selected spacing between the chips 60 and 62 is determined by $$dp = F\lambda$$

where d and p are the pitch of the input lattice and the reciprocal lattice, $\lambda$ is 780 mu and F is the desired between-chip spacing.

It is noted that p and d have a hyperbolic or constant product relationship for fixed F and $\lambda$ by the definition of a reciprocal lattice. Solving then for F, $F = 0.001'' \times 0.128''/780$ mu which is equal to about 10.16 centimeters or about 4 inches for the selected spacing between chips 60 and 62 as shown by FIG. 5.

If one then designates that a D-unit will equal about 2 inches or 5.08 centimeters, then F=2D. This determines the selected spacing of 2D units between the laser diode 52 and lens 58, as well as between chips 60 and 62 when measured on the dimension line 64 of FIG. 5. Dimension line 64 parallels and is equivalent to the length of the optical axis of the system 50.

It is this between-chips distance (2D) that is the controlling dimension for the discoid optical correlator system 10 of the invention.

Continuing with the description of linear optical correlator system 50 of FIG. 5, a polarizer 66 is positioned between the SLM chips 60 and 62. Each of these LIGHT MOD chips has an array of magneto-optic mesas or pixels which, in accordance with the Faraday effect, selectively rotate the incoming linearly polarized light. Each SLM chip requires an entrance polarizer, and an exit polarizer which also functions as an analyzer.

Lastly, lens 68 is positioned on and along the optical axis to focus the output of the filter SLM chip 62 through an exit polarizer/analyzer 70 positioned adjacent an array detector 72 that is a charge coupled device (CCD) which can be formed from a magneto-optic material and structured like the SLM chips.

Referring to the discoid optical correlator system 10 as shown by FIG. 2 in view of the above teachings concerning the linear optical correlator system 50 of FIG. 5, the linear optical correlator system 50 has a relatively long optical path (10 D-units at 2.0 inches per unit equals 20 inches; or 5.08 centimeters per unit equals 50.8 centimeters) as measured along the dimension line 64. This can be folded into optical segments that are each equivalent to a D-unit which determines the diameter D of the disk 16. With a laser diode 52 that produces an output beam width of about 10° minimum, the laser beam will expand to generally cover the input SLM chip 60 when the transform lens 58 is positioned about 2 D-units (here, 4 inches; or 10.16 centimeters) from the laser. This equates to two passes of the laser beam across the diameter D of the disk 16. It is contemplated that other lasers may develop a beam having a different beam divergence. In these instances, a lens such as a microscope lens can be optically cemented to or positioned to cooperate with the laser aperture to alter the beam divergence to a desired dimensional unit. It is contemplated that an appropriate curved surface could be formed in the bottom (beam output side) of the laser mounting hole.

Placement of the output CCD detector 72 is determined by the controlling dimension F and its sub D-units so that the length of path between the filter SLM chip 62 and the CCD detector results in an output image at the detector plane which is appropriately sized. Four (4) D-units (8 inches or 20.32 centimeters) is preferred for the path length of the optical correlator system 10. This will result in an output field or image width of about ⅓ inch or 0.867 centimeter. It is noted that the between-chip spacing of F=2 D-units is the controlling dimension for this system.

Referring to FIG. 2, eleven station positions (S1 through S11) are equally spaced around the discoid rim 14. At station S1, a circular blind hole 76 is bored into the fused quartz material of the discoid body 16. The bottom surface 78 of the blind hole should be optically flat and polished. A sheet polarizer 80 is optically cemented to a laser diode 82 and this unit is similarly cemented into the blind hole 76.

At stations S3 and S7, concave grinding and polishing tools can be used to form concave mirror substrates directly in the discoid body 16. The eight remaining stations (S2, S4 through S6, and S8 through S11) require optically flat areas which are ground and polished on the discoid rim 14. Four of these flat areas (stations S2, and S8 through S10), and the two concave areas at stations S3 and S7 are then metallized; for example, with an evaporated aluminum film which can be protected with a polyurethane film or a dielectric film of silicon monoxide.

A plane mirror, which can be an aluminized thin quartz slab subassembly with a polarizer-film coating (using the Rolyn Company process), is cemented to the optically flat area at station S5 with the polarizer (not shown) facing inward toward the center of the discoid body 14. LIGHT MOD TM SLM chips 84 and 86, which operate in a reflective mode, are cemented at stations S4 and S6. Each of these chips has its reflective surface (not shown) on the outside away from the center of the discoid body. The SLM chip 84 at station S4 operates in an input mode, and the SLM chip 86 at station S6 operates in a filter mode. Like the SLM chips 60 and 6 of the linear optical correlator 50 of FIG. 5, these SLM chips at stations S4 and S6 can be functionally equivalent to the front-lighted magneto-optic display of U.S. Pat. No. 4,472,708 by Robert H. Anderson, which is assigned to the same assignee. If coil erasure is desired for these SLM chips, suitable erase coils can be potted into the surrounding support material for the chips.

A CCD detector array 88 having an attached polarizer (not shown) is cemented to the flat area at station S11 with the polarizer facing inward toward the center of the discoid body 14. This CCD detector array is functionally similar to polarizer 70 and the CCD array 72, when considered as a functional unit, which are described and shown by FIG. 5.

It is contemplated for certain operating environments that the unoccupied areas of the obverse and reverse surfaces of the discoid body 14, and the discoid body rim 16 can be etched, sandblasted, or the like, and then painted flat black to absorb any scattered light radiation. Small adjustments to the lengths of the optical path 18 between associated stations can be achieved by the use of optical shims under the plane mirrors at a selected station or stations (S2, S5, and S8 through S10). In the invention, each functional branch of the optical path between active components of the discoid optical correlator 10 has been provided with at least one such plane mirror; thus, stations S1 through S3 as a functional branch of the optical path have a plane mirror at station S2; stations S4 through S6 have a plane mirror at S5; and stations S7 through S11 have several plane mirrors at S8 through S10. Input and output connections to the several operating components of the discoid optical correlator system 10, such as laser 82, SLM chips 84 and 86, and CCD array 88, can be printed on or connected to the discoid body 16.

Figure 6:
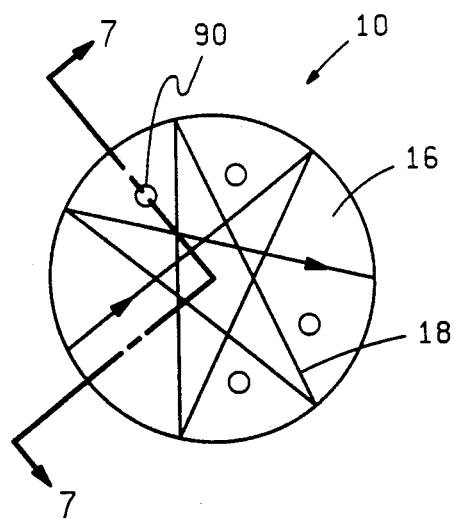
FIG. 6 is a schematic plan view of another embodiment of the discoid optical correlator system of the invention.
Figure 7:
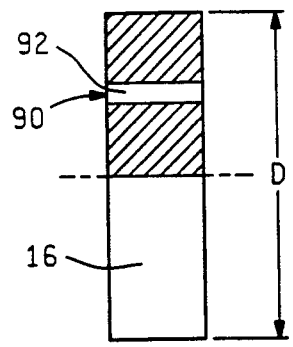
FIG. 7 is a cross-section of the discoid optical correlator system of FIG. 6 along line 7—7.

It is further contemplated that solid disk body 16 as shown by FIGS. 6 and 7 can have one or more light limiting baffles, such as baffle hole 90, drilled into or through the disk body as may be required by the particular optical path 1 developed by the correlator system 10. Where the texture of the inner cylinder surface 92, which results from a forming operation, does not provide an optimum baffle function, the inner cylinder surface 92 can be coated or painted with a suitable optical coating material or an optical black.

Figure 8:
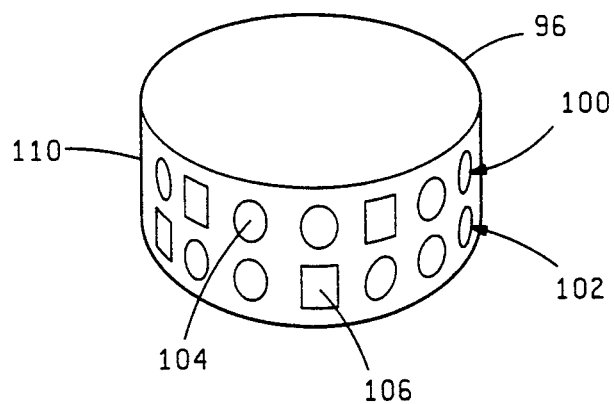
FIG. 8 is a perspective view of another embodiment of the discoid optical correlator system of the invention.

Redundancy of the optical correlator system 10 of the invention can be realized as shown by FIG. 8 through use of a discoid body 96 that has an increased thickness with reference to the thickness of discoid body 16 of FIG. 1. Two optical correlator systems 100 and 102 are positioned in parallel planes with each system's optical components, such as 104 and 106 respectively, positioned along and around the discoid rim 110.

It is contemplated that a greater number of optical correlator systems could be similarly positioned in association with a discoid body having an appropriate thickness to accommodate such number of systems. These plural optical correlator systems 100 and 102 provide a redundant or backup system in the event the other primary optical correlator system fails.

It is also contemplated that optical components of optical correlator system 10 of FIGS. 1 and 2 could be structured into two parallel rings, like the rings developed by the systems 100 and 102 of FIG. 8. However, the orientation of these two parallel rings could also functionally see only one optical path, such as optical path 18. This single optical path would have a predetermined pattern passing between optical components selectively positioned in each of the two rings so that the path lies not only in both of the parallel planes defined by the two rings but also traverses these planes. This would have several advantages: the disk diameter could be reduced; redundant or backup input and spatial filter planes could be available in the event of one or more filter plane failures or malfunctions; and, plural filter planes could be used where one filter would be loaded while a previously loaded filter is being used in the optical path of an operating system. This could be accomplished by having one or more of the reflective plane mirrors selectively moveable rather than permanently fixed as in the optical correlator system 10 as described and shown. It is also contemplated that this use of two parallel rings could facilitate electrical conductor positioning on the optical disk. It may well be that one ring could even be a conventional ring laser which would provide the light input to the optical path of the parallel and adjacent ring.

It is contemplated that certain optical correlator systems could have one or more optical path segments which reflect from a discoid body surface where the angle of incidence permits reflection from the surface to the next reflective optical component along the optical path. Plural reflections from body surfaces is also contemplated.

Figure 9:
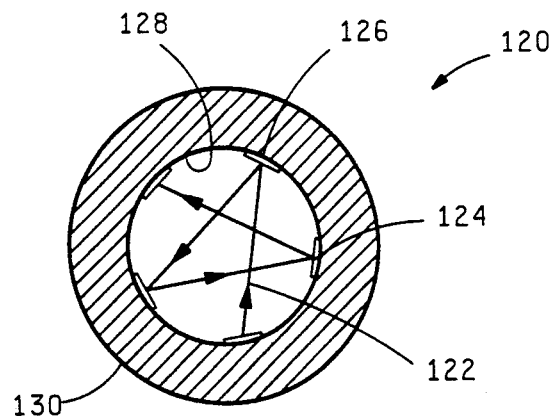
FIG. 9 is a plan view, in cross-section, of another embodiment of the optical correlator system of the invention.

FIG. 9 illustrates an optical correlator system 120 having an optical path 122 determined by the optical correlator components, such as components 124 and 126 which are similar to those of the optical correlator system 10 both in function and symmetrical position, positioned around the inner surface 128 of a solid cylinder or sphere 130 which can be formed from a metal such as aluminum or titanium This optical correlator system 120 would be extremely resistant to large centrifugal spin forces yet would be relatively light weight. It is contemplated that the central void developed by the inner surface could also be filled with a suitable optically transparent material. It is further contemplated that the cylinder or sphere can be formed of a transparent material and such as that used for the discoid body of FIGS. 1 and 2 and that the reflective optical components could be positioned on the inner surface, or the outer surface, or both.

It is also contemplated that the cylinder 130 of FIG. 9 could have the reflective optical components positioned on opposing cylinder-end surfaces with an optical path developed there between generally along the longitudinal axis of the cylinder. The cylinder could also be a functionally similar geometric solid such as a slab or prism.

Figure 10:
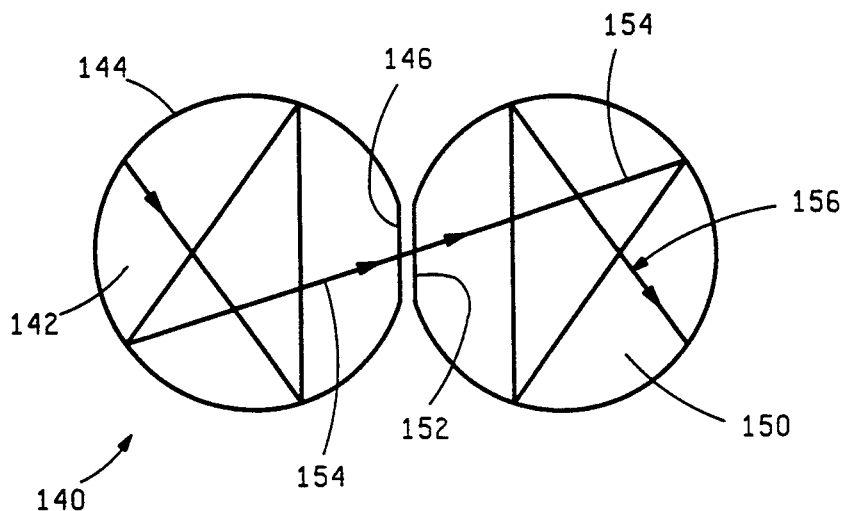
FIG. 10 is a schematic plan view of another embodiment of the optical correlator system of the invention with plural disks.

FIG. 10 illustrates another optical correlator system of the invention. A first disk body 142 has a rim region with a plurality of station positions like disk body 16 of FIGS. 1 and 2. However, station 146 of disk body 142 is a non-reflective station. A second disk body 150, which is similar to disk body 142, is positioned in the same plane as disk body 142 with a non-reflective station 152 adjacent to the non-reflective station 146. It is contemplated that the disk bodies could be suitably positioned s that station 146 adjoins station 152.

In the optical correlator system 140, station 146 functions as an exit port and station 152 functions as an entrance port for segment 154 of an extended optical path 156. A coherent light beam for example is initiated within disk body 142, passes within the disk body between reflective optical components along the symmetrical and folded optical path 156, and through the exit-entrance ports 146 and 152 to terminate within disk body 150. Although the segments of the optical path within each disk remain symmetrical and folded, the use of adjacent (or adjoining when required) disk bodies 142 and 150 develops an extended optical path 156 in the same plane.

As will be evidenced from the foregoing description, certain aspects of the invention are not limited to the particular details of construction as illustrated, and it is contemplated that other modifications and applications will occur to those skilled in this art. It is, therefore, intended that the appended claims shall cover all such modifications and applications that do not depart from the true spirit and scope of the invention.

I claim:

1. A discoid optical correlator system for the detection and identification of an unknown object where the object is represented at an input station of the system, imaged at a subsequent filter station in the Fourier transform plane, then detected and identified at a detector station CHARACTERIZED IN THAT the discoid optical correlator system comprises:
   a) system support means having a perimeter region that defines a number (n) of system stations which are equidistantly spaced apart,
   b) respective ones of reflective optical component means positioned at selected and associated ones of a number (n−2) of said system stations to affect a beam of electromagnetic radiation impinging thereon, said reflective optical component means include an input means and a filter means responsive to an input signal representing an unknown object, and to the Fourier transform output of said input means, respectively,
   c) electromagnetic radiation source means positioned at one of said non-selected system stations generating a beam of electromagnetic radiation for the system, and
   d) electromagnetic radiation detector means positioned at the other of said non-selected system stations responsive to said resulting beam of electromagnetic radiation subsequent to said reflective optical component means affect,
   e) said source means, reflective optical component means, and said detector means develop an optical path within said support means traversed by said beam of electromagnetic radiation so that the unknown object is optically detected and identified.

2. The discoid optical correlator system of claim 1 in which said respective ones of the reflective optical component means are equidistantly spaced apart in diametric reflective opposition to each other.

3. The discoid optical correlator system of claim 2 in which said respective ones are equidistantly spaced apart between adjacent stations and from diametrically opposed pairs of stations.

4. The discoid optical correlator system of claim 1 in which said beam of electromagnetic radiation is a beam of visible radiation or light.

5. The discoid optical correlator system of claim 4 in which said light beam is a coherent light beam.

6. The discoid optical correlator system of claim 1 in which said support means is a solid, optically transparent disk body.

7. The discoid optical correlator system of claim 6 in which said disk body is fused quartz.

8. The discoid optical correlator system of claim 1 in which symmetrical and folded optical path is a multiple star-shaped path.

9. The discoid optical correlator system of claim 1 in which support means is a plurality of similar disk bodies.

10. The discoid optical correlator system of claim 9 in which each of said disk bodies has a non-reflective station adjacent to each other and positioned to pass a segment of said optical path from a first one of said disk bodies to the next adjacent disk body.

11. The discoid optical correlator system of claim 10 in which said first disk body has said electromagnetic radiation source means, and a last disk body has said electromagnetic radiation detector means.

12. The discoid optical correlator system of claim 10 in which non-reflective stations are adjoining.

13. The discoid optical correlator system of claim 1 in which said support means is a cylinder defining an inner cylindrical surface having said system stations.

14. The discoid optical correlator system of claim 1 in which said support means is a sphere defining an inner spherical surface having said system stations.

15. The discoid optical correlator system of claim 1 in which said support means defines and inner surface and an outer surface selectively having said system stations.

16. The discoid optical correlator system of claim 1 in which said support means is a solid disk body having separate perimeter regions each having a number (n) of system stations.

17. The discoid optical correlator system of claim 1 in which support means has at least one baffle means to affect the beam of electromagnetic radiation.

18. The discoid optical correlator system of claim 17 in which said baffle means is a bored hole developing an inner surface in said support means.

19. The discoid optical correlator system of claim 18 in which said inner surface isoptically coated.

20. A discoid optical correlator system comprising:
a) a coherent light source,
b) a first plane reflective surface spaced apart from said light source,
c) a first light path between said light source and said first plane reflective surface,
d) a first curved reflective surface spaced apart from said first plane reflective surface,
e) a second light path between said first plane reflective surface and said first curved reflective surface,
f) a reflective spatial light modulator spaced apart from said first curved reflective surface,
g) a third light path between said first curved reflective surface and said spatial light modulator,
h) a second plane reflective surface spaced apart from said spatial light modulator,
i) a first polarizer associated with said second plane reflective surface and positioned between said second plane reflective surface and said spatial light modulator,
j) a fourth light path between said spatial light modulator and said second plane reflective surface, and through said first polarizer,
k) a reflective spatial filter spaced apart from said second plane reflective surface,
l) a fifth light path between said second plane reflector surface and said spatial filter, and through said first polarizer,
m) a second curved reflective surface spaced apart from said spatial filter,
n) a sixth light path between said spatial filter and said second curved reflective surface,
o) a third plane reflective surface spaced apart from said second curved reflective surface,
p) a seventh light path between said second curved reflective surface and said third plane reflective surface,
q) a fourth plane reflective surface spaced apart from said third plane reflective surface,
r) an eighth light path between said third plane reflective surface and said fourth plane reflective surface,
s) a fifth plane reflective surface spaced apart from said fourth plane reflective surface,
t) a ninth light path between said fourth plane reflective surface and said fifth plane reflective surface,
u) an array display spaced apart from said fifth plane reflective surface,
v) a second polarizer associated with said array display, and positioned between said array display and said fifth plane reflective surface,
w) a tenth light path between said fifth plane reflective surface and said array display, and through said second polarizer,
x) said first through and including said tenth light paths each having the same path length, and
y) support means for the positioning and support of said coherent light source, first plane reflective surface, first curved reflective surface, reflective spatial light modulator second plane deflective surface, first polarizer, reflective spatial filter, second curved reflective surface, third, fourth, and fifth plane reflective surfaces, second polarizer, and array display, where said support means is transparent to said first through and including said tenth light paths.

21. The discoid optical correlator system of claim 20 in which said reflective spatial light modulator is the input plane and said reflective spatial filter is the filter plane for the identification of unknown inputs through optical correlation of an input plane and a plurality of known filters.

22. The discoid optical correlator system of claim 21 in which each of said spatial light modulators are reflective magneto-optic devices.

23. The discoid optical correlator system of claim 20 in which said array display is a charge coupled device.

24. The discoid optical correlator system of claim 20 in which the focal length (4$f$) of the Fourier transforming lenses is equal to the total of each of said third fourth, fifth, and sixth light path lengths ($f$).

* * * * *